Figure 1:
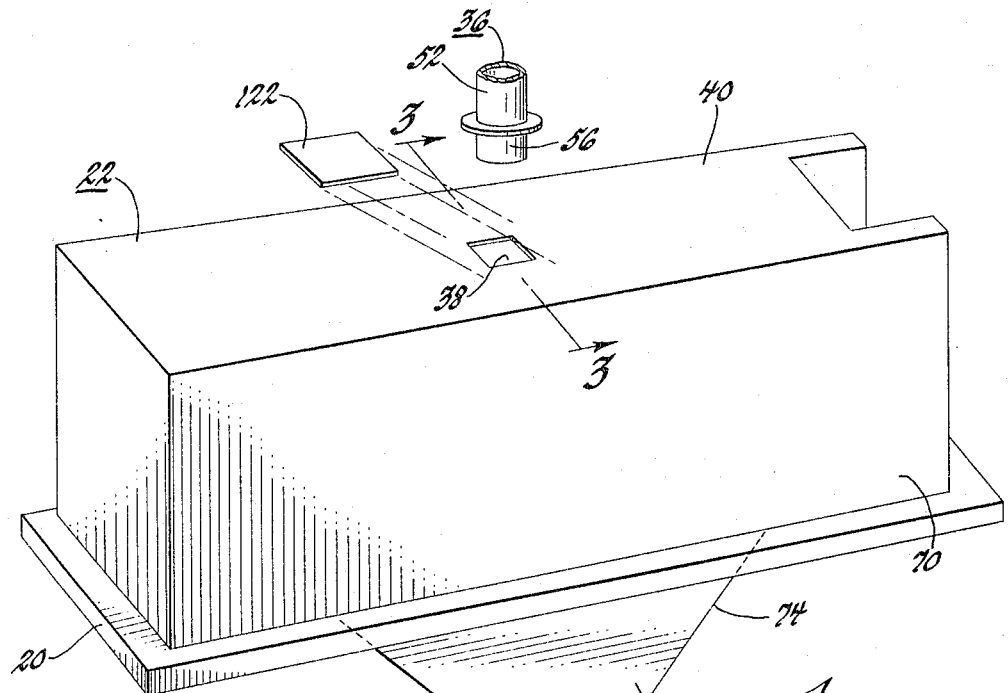

Nov. 29, 1966   H. W. DEATON   3,288,894
METHOD OF INSULATING A HOLLOW WALLED CABINET WHICH
INCLUDES USING UNIFORMLY DISTRIBUTED AND
SPREAD MICROWAVES FOR HEATING
Filed Aug. 26, 1963   2 Sheets-Sheet 1

INVENTOR.
Homer W. Deaton
BY Carl A Stickel
HIS ATTORNEY

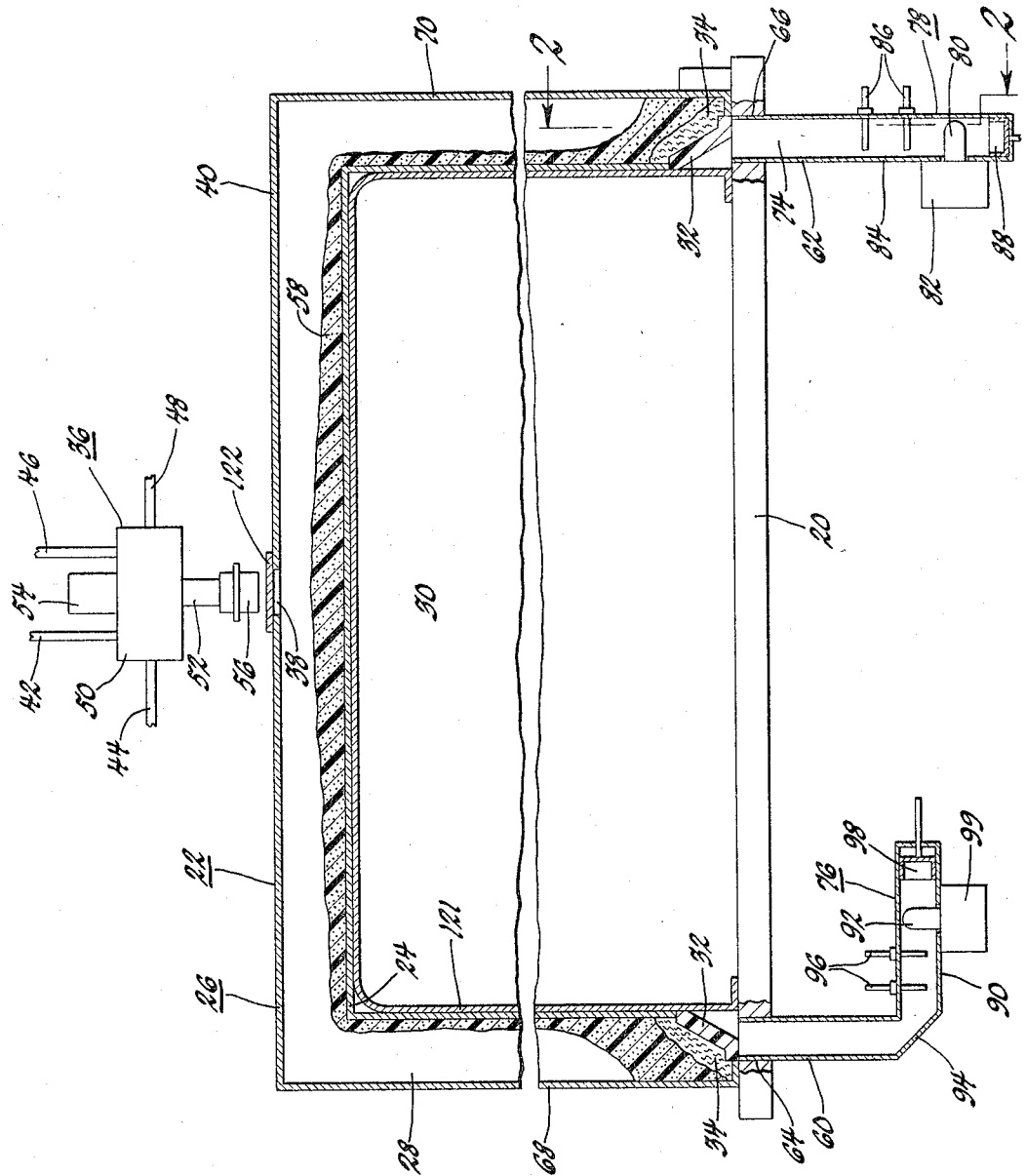

United States Patent Office 3,288,894
Patented Nov. 29, 1966

---

3,288,894
METHOD OF INSULATING A HOLLOW-WALLED CABINET WHICH INCLUDES USING UNIFORMLY DISTRIBUTED AND SPREAD MICROWAVES FOR HEATING
Homer W. Deaton, Dayton, Ohio, assignor to General Motors Corporation, Detroit, Mich., a corporation of Delaware
Filed Aug. 26, 1963, Ser. No. 304,486
5 Claims. (Cl. 264—25)

This invention is related in a general way to a domestic appliance, but more particularly to the insulation of refrigerator cabinets by foam forming material. It especially pertains to the treatment of the foam forming materials with wave energy during their application to the insulation space of the cabinet.

Recently polyurethanes foamed by an insulating gas have been successfully used for insulating refrigerator cabinets. However difficulties have been encountered in making such cellular insulation uniform in structure and density and light in weight. To overcome these difficulties it has been proposed to apply wave energy to speed the reactions of the polyurethanes and the foaming thereof.

It is an object of this invention to provide an efficient method of applying wave energy sufficiently uniformly to all parts of the insulation space of such a cabinet during the introduction, polymerization, expansion and curing of such foam forming materials to obtain a substantially uniform low density, strong cellular foam insulating material cast into and adhering to the walls of the insulation space.

It is another object of this invention to provide a method of effectively introducing into the insulation space of a refrigerator cabinet wave energy parallel to and aligned with the insulation space in one or both side walls of the cabinet for treating the foam forming materials introduced between the inner and outer walls.

These and other objects are attained in the forms shown in the drawings in which generically the insulation space is either enclosed by inner and outer metal walls or enclosed by both nonmetallic and metal walls. Foam forming materials such as polyurethane forming materials containing a volatile insulating gas such as a refrigerant are introduced from a mixer into the insulation space. A microwave generator, preferably, is provided for each sidewall of the cabinet and each is connected to a diverging horn having its sidewalls parallel to the sidewalls of the cabinet and directly aligned with the insulation space. Principally, the horn extends through a metal platform supporting the open side of the cabinet while the foam forming materials are introduced through one or more openings in the backwall of the cabinet. Microwave energy that is useful in carrying out the purpose of this invention falls within the electromagnetic frequency band extending from about the $10^7$ cycles per second to just below the infrared range, namely, below $10^{13}$ cycles per second.

Further objects and advantages of the present invention will be apparent from the following description, reference being had to the accompanying drawings wherein a preferred embodiment of the present invention is clearly shown.

In the drawings:
FIGURE 1 is a perspective view of a refrigerator cabinet resting face down upon a metal platform through which extends a diverging horn connected to a microwave generator.

Figure 2:
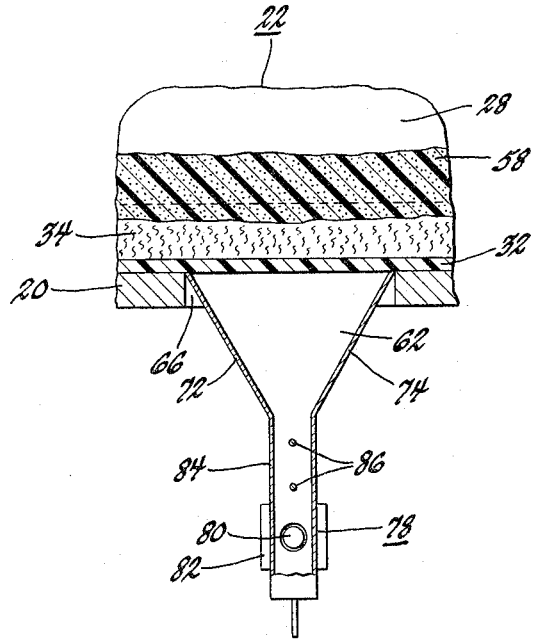

FIGURE 2 is a fragmentary sectional view taken substantially along the line 2—2 of FIGURE 3, and FIGURE 3 is a transverse sectional view taken substantially along the lines of 3—3 of FIGURE 1.

Referring now to the drawings, there is shown a platform 20 of thick metal, such as steel, which supports a refrigerator cabinet 22 positioned with its face or door side down. The door, however, has not yet been assembled to the cabinet. As shown in FIGURE 3, the cabinet includes inner and outer sheet metal walls 24 and 26 enclosing between them an insulation space 28. Adjacent to the open side or door opening providing access to the storage space 30, the spaced rims of the inner and outer walls 24 and 26 are connected by a breaker strip or collar 32 extending completely around the door opening to close the insulation space 28 at the front of the cabinet. Behind the breaker strip 32 there may be provided strips 34 of glass fiber which may be used to receive refrigerant conduits and electrical wiring so that they may be accessible by the removal of the breaker strip 32.

A motor driven mixing apparatus 36 is provided above for supplying the foam forming materials through an aperture 38 in the rear wall 40 of the cabinet. This mixing apparatus 36 includes supply and return conduits 42 and 44 for the "A" component and supply and return conduits 46 and 48 for the "B" component. When delivery of the foam forming material is desired, the two supply conduits 42 and 46 deliver in proper proportion the foam forming material through a valve chamber 50 into the mixing chamber 52 from which the mixed components are delivered, through the opening 38 into the insulation space 28. The mixer 36 includes a driving motor 54 which drives a mixer in the mixing chamber 52 and also a foam flinger (not shown) which is located within the retractible guard 56 which extends into the hole 38 during the supply of the foam forming materials to the space 28. The flinger distributes the mixed components substantially uniformly within the insulation space 28 to provide a deposit 58 within the insulation space which foams to produce a cellular product containing an insulating gas to fill the insulation space.

A number of known and unknown factors apparently has caused lack of uniformity in the cellular structure and density of the foam material. Some of these factors are the heat required to evaporate the insulating gas to cause the foam of the foam forming materials, the exothermic heat of reaction of the foam forming materials, and the heat lost through the walls of the cabinet, as well as the adhesion of the materials to the walls. To overcome this, it has been proposed to liberate wave energy such as microwave energy within the insulation space 28 during and immediately following the introduction of the foam forming materials 58 to facilitate and make more uniform and less dense the resulting foam.

One of the problems in this application of wave energy is to obtain adequate and uniform distribution of the microwaves within the insulation space 28. According to my invention, this is solved appreciably by providing two diverging horns 60 and 62, the upper ends of which extend through slots 64 and 66, in the metal platform 20 which horns are aligned with the insulation space in the side walls 68 and 70 of the cabinet 22. The horns 60 and 62 each have parallel sidewalls which are parallel to the sidewalls 68 and 70 and which are aligned with the insulation space 28 in the sidewalls as well as the sidewalls of the slots 64 and 66. The tapered walls 72 and 74 diverge in width in a ratio of 1–½ to each unit of length. With this arrangement the horns 60 and 62 efficiently transmit the microwaves from their respective microwave generators 76 and 78 to the insulation space 28. The microwaves pass through the plastic breaker strip 32 without difficulty.

The microwave generators 76 and 78 illustrate two different types of connection which may be used. The microwave generator 78 has its walls aligned directly with the flat sidewalls 62 of its horn. It includes a magnetron tube 80, powered by a suitable microwave generating apparatus 82. The microwaves emanating from the magnetron tube 80 within the generator 28 are transmitted directly through the horn 62 into substantially all parts of the insulation space 28 with sufficient uniformity to obtain a substantially uniform foam insulation.

When the inner and outer walls 24 and 26 are of metal they effectively confine the microwaves to the insulation space 28 so that all of the microwaves are applied to the foam forming materials deposited in this space. Should either or both walls be made of a nonmetal such as plastic which can be penetrated by the microwaves, an inner liner 121 extending into contact with the steel platform 20 adjacent the wave guide 60 and 62 may be provided inside of the inner liner 24 so as to confine the microwaves to the insulation space 28. If the outer walls 26 should also be made of nonmetallic material such as plastic, an outer metal liner may also be used to confine the microwaves. If desired, instead of the inner liner 24 being present during the casting of the foam, the liner 121 may be covered with a plastic sheet such as polyethylene to which the foam forming materials will not firmly adhere so that it may be later removed and a removable liner subsequently installed to provide finish walls for the storage space 30.

The wave guide 84 is tuned by the adjustable slugs 86 and the adjustable piston 88 to obtain maximum efficiency. The microwave generator 76 (which is hidden in FIGURE 1) differs from the microwave generator 78 only in that its wave guide 90 is positioned at right angles to the horn 60 so that its waves generated by the magnetron tube 92 are reflected by the 45° wall section 94 in between the wave guide 90 and the horn 60 through the horn 60 into the insulation space 28 where the microwaves spread substantially uniformly throughout this insulation space 28. The wave guide 90 likewise is provided with the adjustable slugs 96 and adjustable piston 98 and a generator 99 for the magnetron tube 92. I prefer the arrangement shown in which a microwave generator and a horn is provided for the insulation space between each of the sidewalls 68 and 70. However, if desired, additional microwave generators and horns may be provided in alignment with the insulation space at the top and bottom of the cabinet extending in a similar way through aligned slots in the metal support 20. Also if desired, the microwave generation can be obtained through the use of only one microwave generator and horn aligned with the insulation space on only one side of the cabinet. Although satisfactory results can be obtained by one generator and horn so arranged, better results can be obtained through the use of two generators and horns as illustrated in FIGURE 3. As one specific example, I prefer a microwave generator which generates at 2450 megacycles. In most instances microwave energy within a frequency of from 250 to 4500 megacycles per second is preferred since the lower frequency waves have improved penetration abilities. The aperture 38 through which the foam forming materials are introduced may be covered by a plate 122 after the completion of the introduction of the foam forming materials.

One specific example of foam forming materials, the "A" component is composed as follows: 79 parts of polyisocyanate mixture together with 21 parts by weight of a polyether "A" as defined hereinafter, are recirculated through the mixer 36 through the conduits 42 and 44. The polyisocyanate mixture is composed of 80 parts of 2,4 toluenediisocyanate and 20 parts of 2,6 toluenediisocyanate. The "B" component is composed of 87 parts of the same polyether "A" to 3 parts of an activator which is composed of two parts of tetramethylbutanediamine and one part of organosilicone surfactant and 38 parts of trichloromonofluoromethane. This "B" component circulated through the conduits 46 and 48 and the valve body 50 of the mixer 36. 100 parts of the "A" or present polymer components is delivered to the valve chamber 50 and a mixer chamber 52 in proportion to 128 parts of the "B" or activator components which is delivered from the pipe 46 through the valve chamber 50 into the mixing chamber 52. This mixture is discharged into the insulation chamber 28 while the microwave generators 76 and 78 are in operation. These generators principally are kept in operation until the foam forming material 58 has completed its reaction, polymerization, foaming, and curing. The microwave generators 76, 78, may for example, operate at 685 watts available intensity.

Through the application of microwave energy in this manner, there is obtained a very uniform, strong, light weight, closed cell insulation permanently containing the insulating gas trichloromonofluoromethane. The trichloromonofluoromethane is liquid when introduced into the insulation space 28 and during the reaction must be vaporized to form the desired cells. When the exothermic heat of reaction of the components is used to vaporize this liquid, much of the heat is robbed from the reaction to satisfy the latent heat of vaporization of this liquid. This is one of the causes for lack of uniformity in the polymerization reaction since the polyurethane forming materials immediately surrounding each cell nucleus are necessarily cooled as the liquid vaporizes. Since the heat of reaction is used to increase the cross linking of the ingredients, it is apparent that the absorption of any of this heat to cause vaporization of the fluid is most likely to cause a non-uniformity through the mass. In the use of my method and apparatus, I have found that the total heat of vaporization of the fluid may be actually supplied by the microwave energy so that the polymerization of the foam forming materials progresses without hindrance previously encountered by reason of the cooling action of the fluid.

While the embodiment of the present invention as herein disclosed, constitutes a preferred form, it is to be understood that other forms might be adopted.

What is claimed is as follows:

1. The method of insulating a hollow walled cabinet having spaced inner and outer metal side and top and bottom and rear walls with an open side and spaced rims bordering the open side which includes introducing plastic resin foam forming materials in between the inner and outer walls, fitting to said spaced inner and outer walls closely adjacent said spaced rims a metal flat sided diverging wave guide with the flat sides thereof substantially in alignment with the space between and substantially parallel to the inner and outer side walls adjacent said open side, and while the foam forming materials react directing wave energy of between $10^7$ and $10^{13}$ cycles per second through the wave guide between said spaced rims into the space between the inner and outer walls to obtain an adequate spreading and uniform distribution of the microwaves within the space between said walls to treat and accelerate the foaming of the foam forming materials between the walls.

2. The method of insulating a hollow walled cabinet having spaced inner and outer metal side and top and bottom and rear walls with an open side and spaced rims bordering the open side which includes locating the cabinet with the open side down and its rear wall facing up and introducing through an opening in the rear wall plastic resin foam forming materials in between the inner and outer walls and while the foam forming materials react directing wave energy of between $10^7$ and $10^{13}$ cycles per second, upwardly in a pattern substantially parallel to and aligned with the space between a portion of the inner and outer metal side walls adjacent said open side diverging in a direction parallel to said side walls between said spaced rims into the space between said inner and outer side walls to obtain an adequate spreading and uniform distribution of the microwaves within the space between said walls for treating and accelerating the foaming of the foam forming materials between the walls.

3. The method of insulating a hollow walled cabinet having spaced nested inner and outer walls and providing means for preventing the escape of microwaves from said walls, said cabinet having an open side with the open sides being adjacent and having spaced rims bordering the open sides which includes fitting adjacent said spaced rims a metal diverging wave guide having two spaced substantially parallel flat sides in alignment with and substantially parallel to a portion of the space between the inner and outer walls adjacent the spaced rims, introducing plastic foam forming materials into the space between the walls and during the reaction of said materials directing wave energy of between $10^7$ and $10^{13}$ cycles per second through the wave guide between said spaced rims into the space between the inner and outer walls to obtain an adequate spreading and uniform distribution of microwaves within the space between said walls to treat and accelerate the foaming of the foam forming materials between the walls.

4. The method of insulating a hollow walled cabinet having spaced inner and outer metal side and top and bottom and rear walls with an open side and spaced rims bordering the open side which includes introducing plastic resin foam forming materials in between the inner and outer walls and while the foam forming materials react, directing wave energy of between $10^7$ and $10^{13}$ cycles per second in a diverging pattern outside said spaced walls toward and substantially parallel to and aligned with the space between a portion of the inner and outer walls adjacent said open side prior to the entrance between said spaced walls and thence between said spaced rims in a direction parallel to said portion of said inner and outer walls into said space between said inner and outer walls to obtain an adequate spread and uniform distribution of the microwaves within the space for treating and accelerating the foaming of the foam forming materials between the walls.

5. A method as defined in claim 4 in which the diverging pattern of the microwaves diverges in width about in a ratio of one unit for each one-half unit of length.

References Cited by the Examiner

UNITED STATES PATENTS

| | | | |
|---|---|---|---|
| 2,603,741 | 7/1952 | Seifried et al. | 219—10.55 X |
| 2,827,537 | 3/1958 | Haagensen | 219—10.55 |
| 2,841,205 | 7/1958 | Bird | 264—47 |
| 2,856,497 | 10/1958 | Rudenberg | 219—10.55 |
| 3,182,166 | 5/1965 | Bohm et al. | 219—10.55 |
| 3,209,056 | 9/1965 | Jacobs | 254—54 X |

OTHER REFERENCES

Lanigan, W. J.: "Microwave Curing of Flexible Polyurethane Foam Mouldings." In British Plastics, October 1963, pp. 562–565. Copy in 264–54.

ROBERT F. WHITE, *Primary Examiner.*

ALEXANDER H. BRODMERKEL, *Examiner.*

P. E. ANDERSON, *Assistant Examiner.*